(12) United States Patent  (10) Patent No.: US 7,791,961 B2
Kitazaki et al.  (45) Date of Patent: Sep. 7, 2010

(54) SEMICONDUCTOR DEVICE AND METHOD FOR BOOSTING WORD LINE

(75) Inventors: Kazuhiro Kitazaki, Tokyo (JP); Kazuhide Kurosaki, Tokyo (JP)

(73) Assignee: Spansion LLC, Sunnyvale, CA (US)

( * ) Notice: Subject to any disclaimer, the term of this patent is extended or adjusted under 35 U.S.C. 154(b) by 0 days.

(21) Appl. No.: 12/406,845

(22) Filed: Mar. 18, 2009

(65) Prior Publication Data

US 2009/0175096 A1  Jul. 9, 2009

Related U.S. Application Data

(63) Continuation of application No. 11/502,957, filed on Aug. 11, 2006, now Pat. No. 7,525,853, which is a continuation-in-part of application No. PCT/JP2005/014812, filed on Aug. 12, 2005.

(51) Int. Cl.
  *G11C 7/00* (2006.01)
(52) U.S. Cl. .................. 365/189.11; 365/230.06; 365/230.01
(58) Field of Classification Search ........... 365/189.11, 365/230.06, 230.01
  See application file for complete search history.

(56) References Cited

U.S. PATENT DOCUMENTS

| 5,287,325 | A | * | 2/1994 | Morita | ............ 365/230.06 |
| 5,394,077 | A | | 2/1995 | Atsumi | |
| 6,002,630 | A | | 12/1999 | Chuang et al. | |
| 6,208,561 | B1 | | 3/2001 | Le et al. | |
| 6,469,942 | B1 | | 10/2002 | Kurihara | |
| 6,473,321 | B2 | * | 10/2002 | Kishimoto et al. | ............ 363/59 |
| 6,525,972 | B2 | | 2/2003 | Yanagisawa | |
| 2001/0017797 | A1 | | 8/2001 | Zammattio et al. | |
| 2003/0151449 | A1 | | 8/2003 | Nakagawa et al. | |
| 2003/0151958 | A1 | | 8/2003 | Mihara | |
| 2006/0095732 | A1 | | 5/2006 | Tran et al. | |

FOREIGN PATENT DOCUMENTS

| JP | 5081859 | 4/1993 |
| JP | 6028876 | 2/1994 |
| JP | 9074738 | 3/1997 |
| JP | 11306778 | 11/1999 |
| JP | 2004079036 | 3/2004 |

* cited by examiner

*Primary Examiner*—Son Dinh
*Assistant Examiner*—Nam Nguyen

(57) ABSTRACT

A semiconductor device of the present invention includes a booster circuit that boosts a selected word line (WL) to a given voltage higher than a power supply voltage and a charge pump circuit that retains the boosted word line (WL) at the first given voltage. When the booster circuit boosts the word line, the voltage level is degraded as the time goes. However, it is possible to program the memory cell and read out thereof properly by retaining the voltage of the word line with the charge pump circuit.

20 Claims, 13 Drawing Sheets

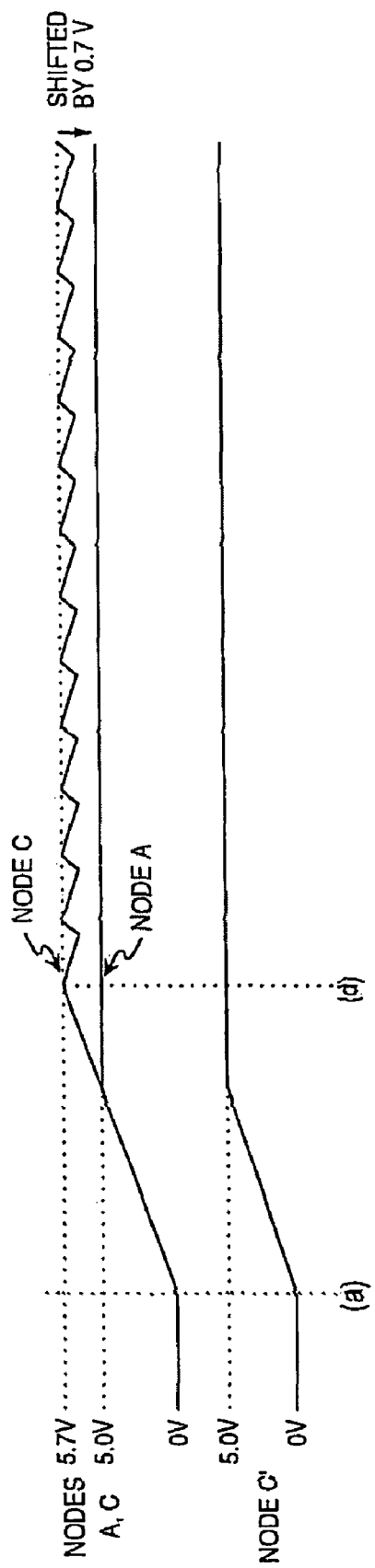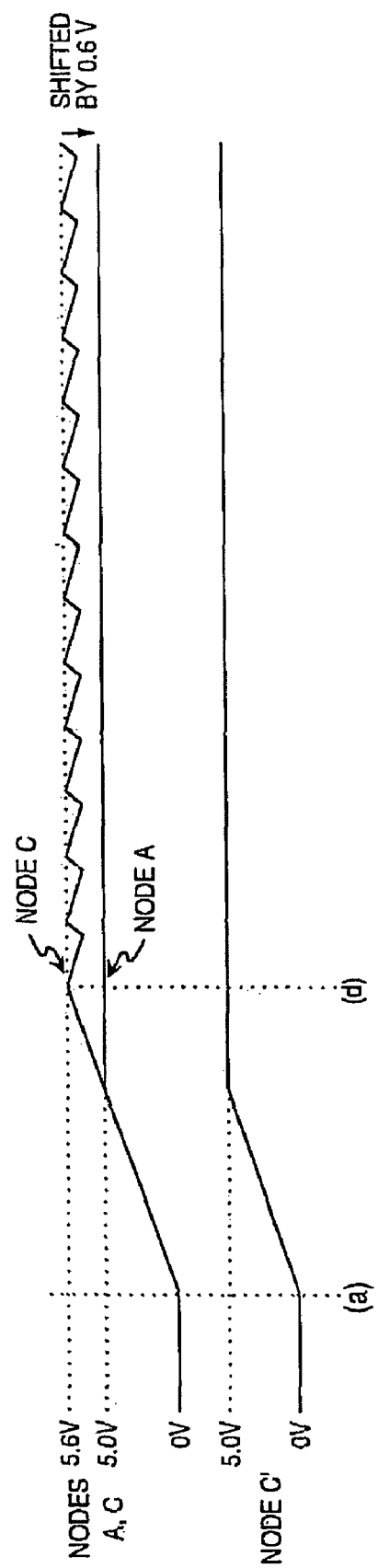
FIG. 12A
FIG. 12B

US 7,791,961 B2

SEMICONDUCTOR DEVICE AND METHOD FOR BOOSTING WORD LINE

CROSS-REFERENCES TO RELATED APPLICATIONS

This patent application is a Continuation of U.S. patent application Ser. No. 11/502,957, filed Aug. 11, 2006, which is a continuation in part of International Application No. PCT/JP2005/014812 filed Aug. 12, 2005, which was not published in English under PCT Article 21(2), and which are incorporated herein by reference in their entirety.

TECHNICAL FIELD

This invention generally relates to semiconductors and word line boosting methods, and more particularly, to a boosting method of a selected word line.

BACKGROUND OF THE INVENTION

In reading out data stored in a semiconductor device, a voltage higher than the power supply voltage is necessary, in some cases. For example, on a flash memory that uses the power supply voltage of 3 V, a voltage of 5 V has to be applied at the time of reading the data. On this account, a booster circuit is necessary for boosting the power supply voltage to generate a gate voltage.

With respect to the flash memory, it takes approximately 100 nanoseconds to read out the data, and boosting has to be completed in 20 to 30 nanoseconds. This is why the booster circuit is mainly employed as a circuit for boosting in the flash memory. The booster circuit boosts the voltage up to a desired one rapidly with a control signal different from a clock signal.

Referring to FIG. 1 (Prior Art), a description will be given of a boost operation at the time of reading out the data. FIG. 1 (Prior Art) shows a voltage generating circuit 11 supplying the voltage and an X decoder 6 selectively supplying the voltage from the voltage generating circuit 11 to a word line (WL). Once the data starts to be read out, a switch 25 shown in FIG. 1 (Prior Art) turns on, and a power supply voltage Vcc (26) is coupled with a node A. This charges the node A connected to the selected word line (WL) and the X decoder 6, to the Vcc level, as shown in FIG. 2 (Prior Art).

A booster circuit 20 includes a pulse generating circuit 21 and a boosting capacitor 22, and the pulse generating circuit 21 is connected to the node A through the boosting capacitor 22. The node A is charged up to Vcc, the switch 25 is opened to disconnect the node A from the power supply voltage Vcc (26), and generates positive pulses are output from the pulse generating circuit 21 in the booster circuit 20. FIG. 2 (Prior Art) shows the voltage of a node B that connects the pulse generating circuit 21 and the boosting capacitor 22. A one-shot positive pulse output is applied to the boosting capacitor 22 from the pulse generating circuit 21, and the node A is boosted up to the level higher than Vcc by capacitive coupling of the boosting capacitor 22. This boosted voltage is applied to, for example, a gate of a memory cell that selects 5 V.

Japanese Patent Application Publication No. 2001-35174 discloses a semiconductor memory device having a booster circuit in which changes in the power supply voltage and those in temperature in the boosting voltage have been compensated.

While the pulse generating circuit 21 is generating the positive pulse outputs, the word line (WL) that has been boosted by the booster circuit 20 maintains the boosted level. However, in fact, a minute leakage current occurs in the X decoder 6, and accordingly, the voltage level of the node A gradually decreases as time goes, as shown in FIG. 2 (Prior Art).

If the data is just read out of one memory cell, it takes a short period of time and the decreased voltage does not cause a problem. However, if one word line (WL) has to be boosted up for a long time as a burst reading, the decreased voltage in the node A is a problem. Japanese Patent Application Publication No. 2001-35174 does not describe the aforementioned problem or means for solving the problem.

SUMMARY OF THE INVENTION

The present invention has been made in view of the above-mentioned circumstances and has an object of providing a semiconductor device and a word line boosting method that can apply the voltage higher than the power supply voltage to the selected word line.

In order to achieve the object, according to an aspect of the present invention, preferably, there is provided a semiconductor device including a booster circuit that boosts a selected line to a first given voltage higher than a power supply voltage, and a charge pump circuit that retains the selected line at the first given voltage. Boosting with the booster circuit may decrease the voltage level as the time goes, however, by providing the charge pump circuit to retain the boosted voltage of the line, it is possible to prevent the line from decreasing the level and to write into and read from the memory cell correctly. Hereinafter, a description will be given of the selected line regarded as a word line.

On the above-mentioned semiconductor device, the charge pump circuit may be coupled with a node boosted by the booster circuit via a first diode. The charge pump circuit is connected to the node boosted by the booster circuit via the diode, and the voltage of the node boosted by the charge pump circuit will not be decreased.

The above-mentioned semiconductor device may further include an address transition detecting circuit that instructs the booster circuit and the charge pump circuit to start operating when detecting a change of address information. This configuration makes it possible to notify the booster circuit and the charge pump circuit of the timing of the start of boosting.

On the above-mentioned semiconductor device, the charge pump circuit may have a plurality of boost stages, and nodes between neighboring boost stages are charged up by a given voltage. By using the charge pump circuit having the aforementioned configuration, a desired voltage boosted by the charge pump circuit is obtainable, even in a low power supply voltage.

On the above-mentioned semiconductor device, the booster circuit may have a plurality of stages. By using the booster circuit having the aforementioned configuration, a desired voltage boosted by the booster circuit is obtainable, even in a low power supply voltage.

On the above-mentioned semiconductor device, the charge pump circuit may retain the selected line at the first given voltage during a read operation in which data is read from memory cells connected to the selected line and successively selected. While the multiple memory cells connected to the word line are successively being selected, the voltage of the word line is not decreased and the data can be read out of the multiple memory cells successively.

On the above-mentioned semiconductor device, the booster circuit may produce the first given voltage by a one-shot pulse output by the address transition detecting circuit. The booster circuit generates the first given voltage with one-shot pulse output from the address transition detecting circuit, and it is possible to retain the word line at the desired voltage after the change in the address is detected.

On the above-mentioned semiconductor device, the charge pump circuit may be driven by a clock signal so as to retain the selected line at the given voltage.

On the above-mentioned semiconductor device, the booster circuit and the charge pump circuit respectively may include capacitors, and the capacitor of the booster circuit has a capacitance greater than that of the capacitance of the charge pump circuit. On this account, the circuit area does not increase more than necessary.

According to another aspect of the present invention, preferably, there is provided a method comprising the steps of boosting a selected line to a first given voltage higher than a power supply voltage, and retaining the selected line at the first given voltage. By providing the step of retaining the voltage boosted by the step of boosting at the given voltage, although the voltage level is decreased as the time goes by, the word line can be prevented from decreasing. It is therefore possible to write into and read from the memory cell correctly.

The above-mentioned semiconductor device may further include a regulation circuit connected to a charge pump output node provided between the charge pump circuit and the first diode and retaining the charge pump output node at a second given voltage. This configuration is capable of retaining the charge pump output node at the given voltage.

On the above-mentioned semiconductor device, the regulation circuit may be coupled with the charge pump output node via a second diode. This configuration enables the charge pump output node to retain at the voltage of the regulation circuit plus the threshold voltage of the second diode.

On the above-mentioned semiconductor device, a forward threshold voltage of the second diode may be substantially the same as that of the first diode. This configuration makes it possible to suppress the fluctuations of the node voltage boosted by the booster circuit due to the fluctuations in the manufacturing process.

On the above-mentioned semiconductor device, the regulation circuit may retain a node provided between the second diode and the regulation circuit at substantially the same voltage as the first given voltage. The afore-mentioned configuration is capable of further suppress the fluctuations in the node voltage boosted by the booster circuit due to the fluctuations in the manufacturing process.

The present invention is capable of providing a voltage higher than that of a power supply voltage to a selected word line during a read operation.

BRIEF DESCRIPTION OF THE DRAWINGS

FIG. 12A is a view showing the voltage waveforms of respective nodes when a threshold voltage of a diode of the second embodiment is 0.7 V; and FIG. 12B is a view showing the voltage waveforms of the respective nodes when a threshold voltage of the diode of the second embodiment is 0.6 V.

DETAILED DESCRIPTION OF EMBODIMENTS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

A description will now be given, with reference to the accompanying drawings, of embodiments of the present invention.

First Embodiment

Figure 3:
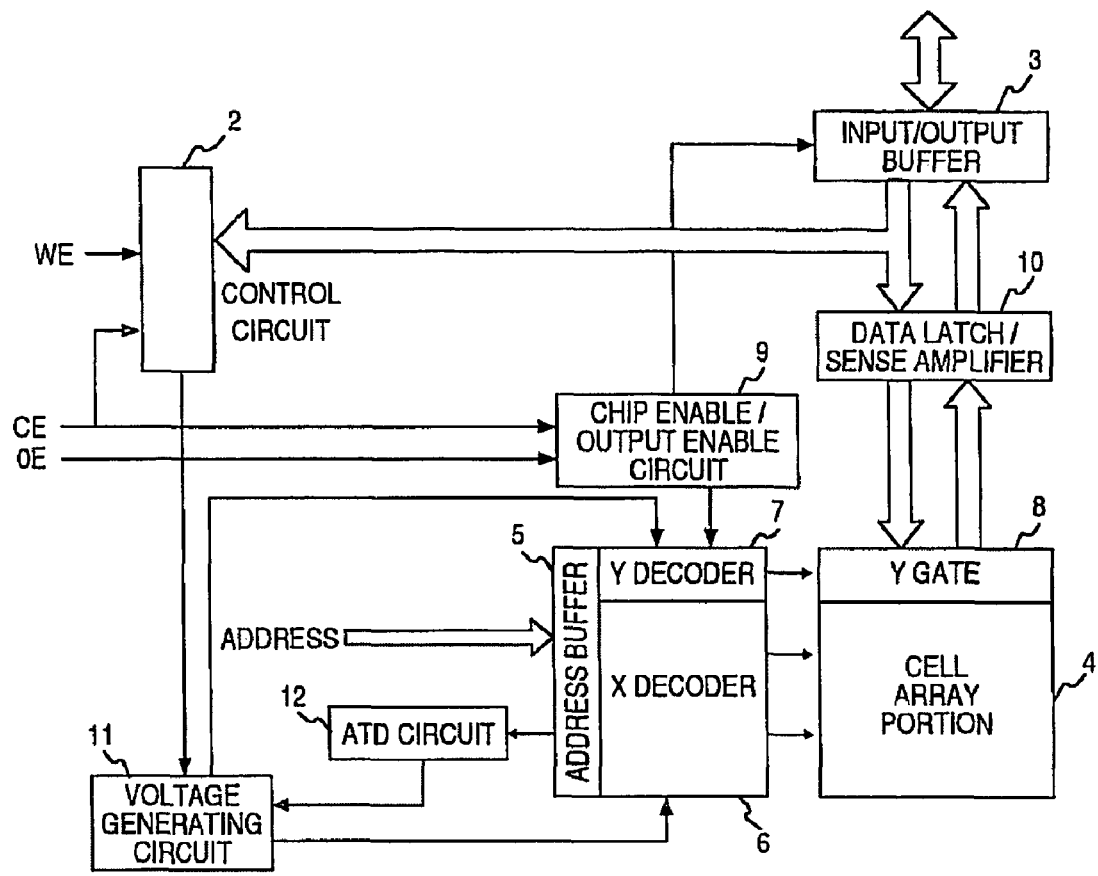
FIG. 3 is a whole configuration of a semiconductor device.

FIG. 3 is a whole configuration of a semiconductor device 1. The semiconductor device 1 includes a control circuit 2, an input/output buffer 3, a cell array portion 4, an address buffer 5, the X decoder 6, a Y decoder 7, a Y gate 8, a chip enable/output enable circuit 9, a data latch/sense amplifier 10, the voltage generating circuit 11, and an address transition detecting circuit (hereinafter, referred to as ATD circuit) 12, as shown in FIG. 3. The semiconductor device 1 may be that such as the flash memory solely packaged, or may be incorporated as a part of the semiconductor device such as a system LSI.

The control circuit 2 internally has a command register, operates in synchronization with a chip enable signal CE or a write enable signal WE supplied from the outside, generates a timing signal according to the command applied from the outside, and outputs to each part.

The input/output buffer 3 receives the data from the outside, and supplies the data to the control circuit 2 and the data latch/sense amplifier 10.

The cell array portion 4 includes a control gate connected to the word line WL, a drain connected to a bit line BL, a source connected to a source line, and a non-volatile memory cell MC having a floating gate made of polysilicon as a charge storing layer. Multiple memory cells are arranged in a matrix.

At the time of reading the data, the data is read out to the bit line from the memory cell designated by an activated word line. At the time of writing (hereinafter referred to as programming) or erasing, by setting the word line and the bit line to appropriate potentials according to the respective operations, an electron is injected into or extracted from the memory cell.

The address buffer 5 latches address information supplied from the outside, and applies to the X decoder 6 and the Y decoder 7.

The X decoder 6 selectively activates word lines WL based on the respective addresses at the time of programming, erasing, and reading the data. A high voltage is supplied to the word line from the voltage generating circuit 11. The Y decoder 7 specifies the address in a Y direction indicated by an address signal, and turns on a transistor in the corresponding Y gate.

The Y gate 8, based on a decode address signal, selectively connects the bit line BL in the cell array portion 4 to a sense amplifier of the data latch/sense amplifier 10 at the time of reading. Also, the Y gate 8 selectively connects the bit line BL in the cell array portion 4 to a data latch of the data latch/sense amplifier 10 at the time of programming. This establishes a data read/program path of the memory cell MC in the cell array portion 4.

The chip enable/output enable circuit 9 receives the chip enable signal CE to activate the Y decoder 7, and receives an output enable signal OE to activate the input/output buffer 3.

The data latch/sense amplifier 10 latches the data applied from the input/output buffer 3 at the time of programming. The data latched in the data latch/sense amplifier 10 is output to the bit line selected by the Y gate 8. The data latch/sense amplifier 10 amplifies the data read onto the bit line at the time of reading to the level that can be dealt as a digital level.

The data latch/sense amplifier 10 determines the data read out of the cell array portion 4. The data is determined whether 0 or 1, by comparing the current of the data with a reference current, the data being supplied from the cell array portion 4 according to designation by the X decoder 6 and the Y decoder 7. The reference current is supplied from a reference cell, not shown. A determination result is supplied to the input/output buffer 3 as a read-out data.

The ATD circuit 12, after detecting a change in the address signal, outputs an ATD signal to the pulse generating circuit 21 and a charge pump circuit 23.

Figure 4:
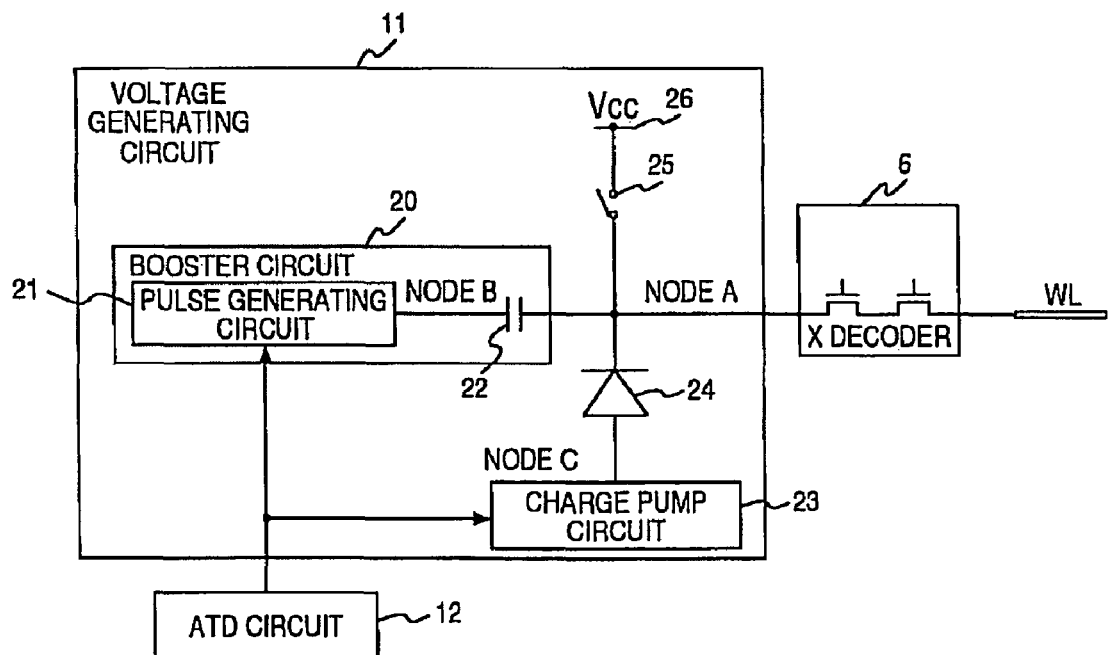
FIG. 4 is a view showing a configuration of a voltage generating circuit of the present invention.

Referring to FIG. 4, a description will be given of a configuration of the voltage generating circuit 11. The node A, which connects the X decoder 6 and the voltage generating circuit 11, is connected by the power supply voltage Vcc (26) that charges the node A to the power supply voltage Vcc, the booster circuit 20 that boosts the node A, and the charge pump circuit 23 that prevents the boosted level of the node A from decreasing. The power supply voltage Vcc (26) is coupled with the node A via the switch 25, and the charge pump circuit 23 is coupled with the node A via a diode 24 (a first diode).

The charge pump circuit 23 charges a node C connecting the charge pump circuit 23 and the diode 24 to a given voltage. In accordance with the present embodiment, the threshold value of the diode is set to 0.7 V, and the node C is charged to 5.7 V, which is higher than the node A by 0.7 V. The anode of the diode 24 is connected to the charge pump circuit 23, and the cathode thereof is connected to the node A.

Figure 1:
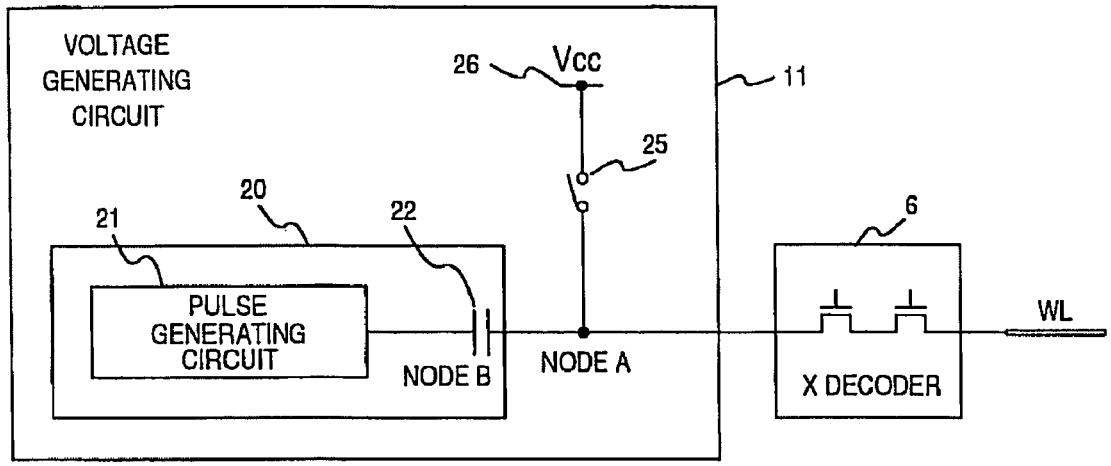
FIG. 1 (Prior Art) is a view showing a configuration of a conventional voltage generating circuit.
Figure 2:
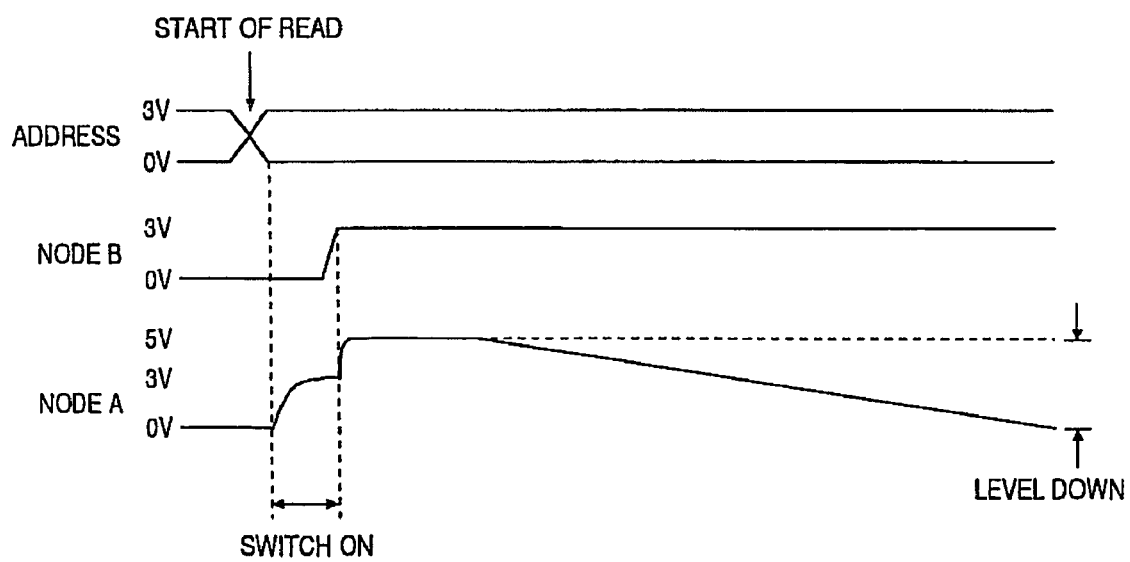
FIG. 2 (Prior Art) is a view showing voltage waveforms of nodes A and B in the voltage generating circuit.

The booster circuit 20, as shown in FIG. 1 (Prior Art), includes the pulse generating circuit 21 and the boosting capacitor 22 and the pulse generating circuit 21 is coupled with the node A through the boosting capacitor 22. A readout voltage of 5.0 V is supplied to the word line from the node A.

The ATD signal is input from the ATD circuit 12 to the charge pump circuit 23 and the pulse generating circuit 21.

Referring to a voltage waveform chart in every node in the voltage generating circuit 11 in FIG. 5, a description will be given of the operation of the voltage generating circuit 11. Here, the nodes A through C are reset to Vss in advance. The ATD circuit 12 detects a change in the address, and then the ATD signal is output to the pulse generating circuit 21 and the charge pump circuit 23 ((a) in FIG. 5). The read operation starts from the memory cell MC, and the X decoder 6 connects the selected word line (WL) and the node A. At the same time, the switch 25 is closed, the power supply voltage Vcc is coupled with the node A, and the node A is charged to the Vcc level ((b) in FIG. 5). After the node A is charged to the Vcc level, the switch 25 is opened to disconnect the node A from the power supply voltage Vcc (26).

The boosting capacitor 22 in the booster circuit 20 is also charged to the power supply voltage Vcc by the power supply voltage Vcc (26). In this state, if a one-shot positive pulse output is applied from the pulse generating circuit 21 to the boosting capacitor 22, the node A is boosted up to the level greater than Vcc by the capacitive coupling of the boosting capacitor 22 ((c) in FIG. 5). The capacitance of the boosting capacitor 22 and that of the pulse generating circuit 21 activating the boosting capacitor 22 are great enough to enable a high-speed read and to shorten the boosting period. Here, in the following description, the Vcc level is set to 3 V and the voltage (a first given voltage) boosted by the booster circuit 20 is set to 5 V, but the voltages are not limited to the aforementioned values.

Figure 5:
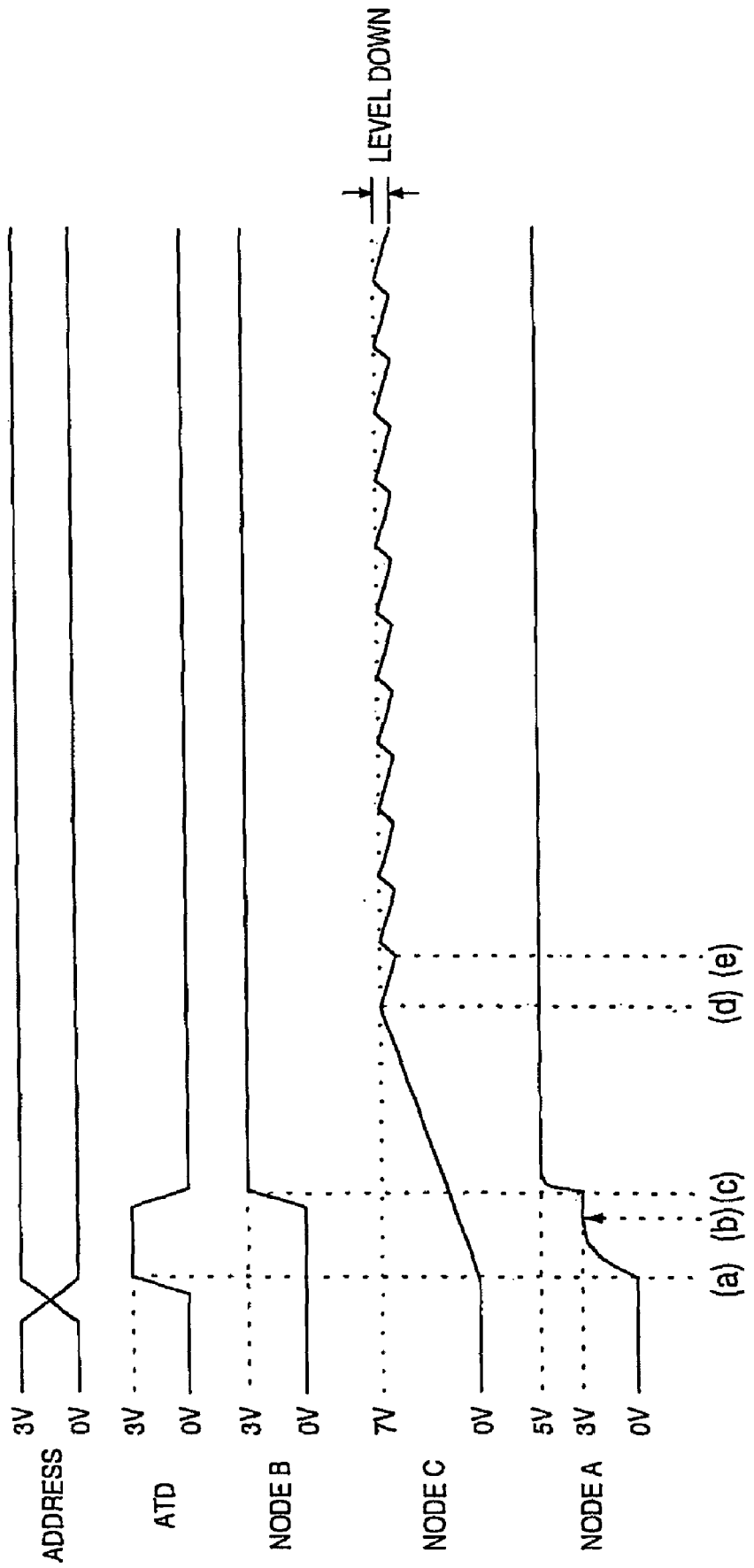
FIG. 5 is a view showing voltage waveforms of nodes the voltage generating circuit.

The charge pump circuit 23 starts operating after the ATD signal in input from the ATD circuit 12, and needs approximately 1 microsecond to reach a given voltage level ((d) in FIG. 5). This makes a period in which the node C has the voltage lower than that of the node A that has been boosted by the booster circuit 20. However, a reverse bias is applied to the diode 24, a current does not flow from the node A to the node C, and the potential of the node A does not change.

After the output from the charge pump circuit 23 reaches the given voltage level ((d) in FIG. 5), a potential difference between the node A and the node C is 0.7 V, while the node A is maintained to 5 V by the booster circuit 20. After a certain period has passed since the booster circuit 20 started boosting, the voltage level of the node A gradually decreases and becomes lower than 5 V. However, the node C maintains 5.7 V and the potential difference across the diode 24 exceeds 0.7 V, resulting in a current flowing from the node C through the node A. This raises the potential of the node A and the voltage of the node A is kept constant. Here, there are minute fluctuations in the potential of the node C after (d) in FIG. 5, but this is caused by the operation of a regulation circuit that maintains the potential of the node C, as will be described later. Even if the voltage level of the node C is lowered by the operation of the regulation circuit as shown in (e) in FIG. 5, the node A is in a floating state, because the diode 24 is reversely connected from the node A to the node C. The voltage of the node A is kept constant. In this manner, the voltage level of the node A is retained at 5.0 V.

While the booster circuit 20 is boosting, the voltage level is decreased as the time goes, but by retaining the voltage of the word line with the charge pump circuit 23, the word line is prevented from decreasing the level. It is therefore possible to program and read the memory cell correctly.

Figure 6:
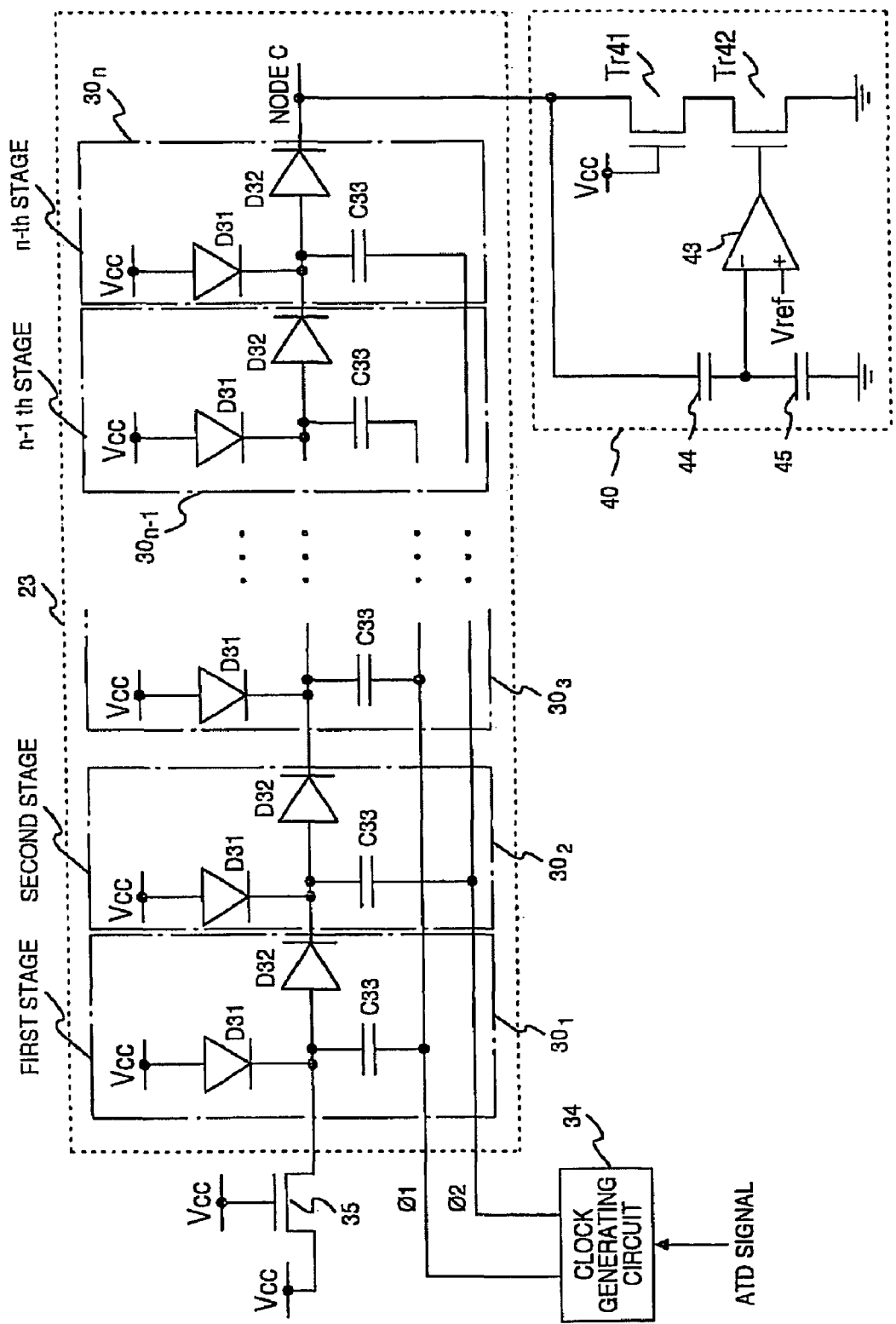
FIG. 6 is a view sowing a configuration of a charge pump circuit.
Figure 7:
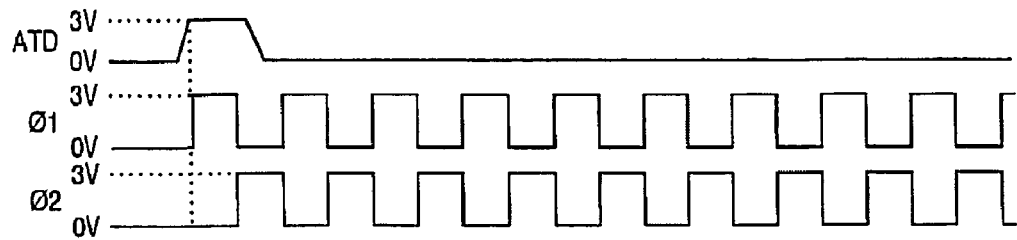
FIG. 7 is a view showing the waveforms of pulses Φ1 and Φ2 input into a charge pump circuit 23.

Next, referring to FIG. 6, a detailed description will be given of the charge pump circuit 23. The charge pump circuit 23 includes a transistor 35 and multiple boost stages $30_1$ through $30_n$. The power supply voltage Vcc is coupled with an input of a first boost stage $30_1$, and the node C shown in FIG. 4 is coupled with an output of an n-th boost stage $30_n$. Every boost stage includes two diodes D31 and D32 and one capacitor C33. The diodes D31 and D32 are composed, for example, of a transistor connected by a diode. One end of the capacitor C33 is precharged to a power supply voltage Vcc-Vth (Vth denotes a forward voltage drop of the diode) via the diode. Clock signals Φ1 and Φ2 are applied to the other end of the capacitor C33. The clock signals Φ1 and Φ2 are complementary signals generated by a clock generating circuit 34 shown in FIG. 6. FIG. 7 shows the waveforms of the clock signals Φ1 and Φ2. The clock signal Φ1 starts and becomes a high level (for example, 3 V), the capacitor C33 is boosted, and the charge of the capacitor C33 is charged to the capacitor C33 in the neighboring stage through the diode 32. Then, the clock signal Φ1 starts and becomes a high level and the clock signal Φ2 starts and becomes a high level simultaneously, the neighboring capacitor C33 is boosted, and the charge of the capacitor C33 is charged to the capacitor C33 in the further neighboring stage through the diode 32. Consequently, by repeating the aforementioned operations, the output voltage is gradually increased and a boosted voltage will be output in the end.

Referring to FIG. 5 again, the boosting period by the charge pump circuit 23 is longer than that by the booster circuit 20. The charge pump circuit 23 only has to retain the potential boosted by the booster circuit 20, and so a high-speed operation is not necessary. The capacitance of the capacitor C33 and that of the clock generating circuit 34 activating thereof are configured to be smaller than that of the booster circuit 20. This does not make a circuit area greater than necessary.

Next, a description will be given of a regulation circuit 40 that maintains the voltage of the node C constant. As shown in FIG. 6, in the regulation circuit 40, an nMOS transistor 41 and an nMOS transistor 42 connected in series are connected to a wiring coupled with the node C. The gate of the nMOS transistor 41 is connected to the power supply voltage Vcc, and an output from a comparator 43 is input into the gate of the nMOS transistor 42. Capacitors 44 and 45 connected in series are connected to the wiring coupled with the node C. The voltage of the node C is divided by the capacitors 44 and 45 in a given ratio. The comparator 43 compares divided voltage values of the capacitors 44 and 45 with the reference voltage. If the divided voltage values exceed the reference voltage (that is, the voltage of the node C is greater than 5.7 V), a high-level signal is output to the gate of the nMOS transistor 42. This decreases the voltage level of the node C. If the divided voltage values are below the reference voltage (that is, the voltage of the node C is lower than 5.7 V), a low-level signal is output to the gate of the nMOS transistor 42 and the nMOS transistor 42 turns off. The regulation circuit 40 retains the voltage of the node C at a given voltage (5.7 V) with the above-mentioned operation. The minute fluctuations in the node C shown in FIG. 5 are caused by the operation of the regulation circuit 40.

By using the charge pump circuit 23 having the above-mentioned configuration, a desired boosting voltage is obtainable in boosting with the charge pump circuit even if the power supply voltage is low.

Figure 8:
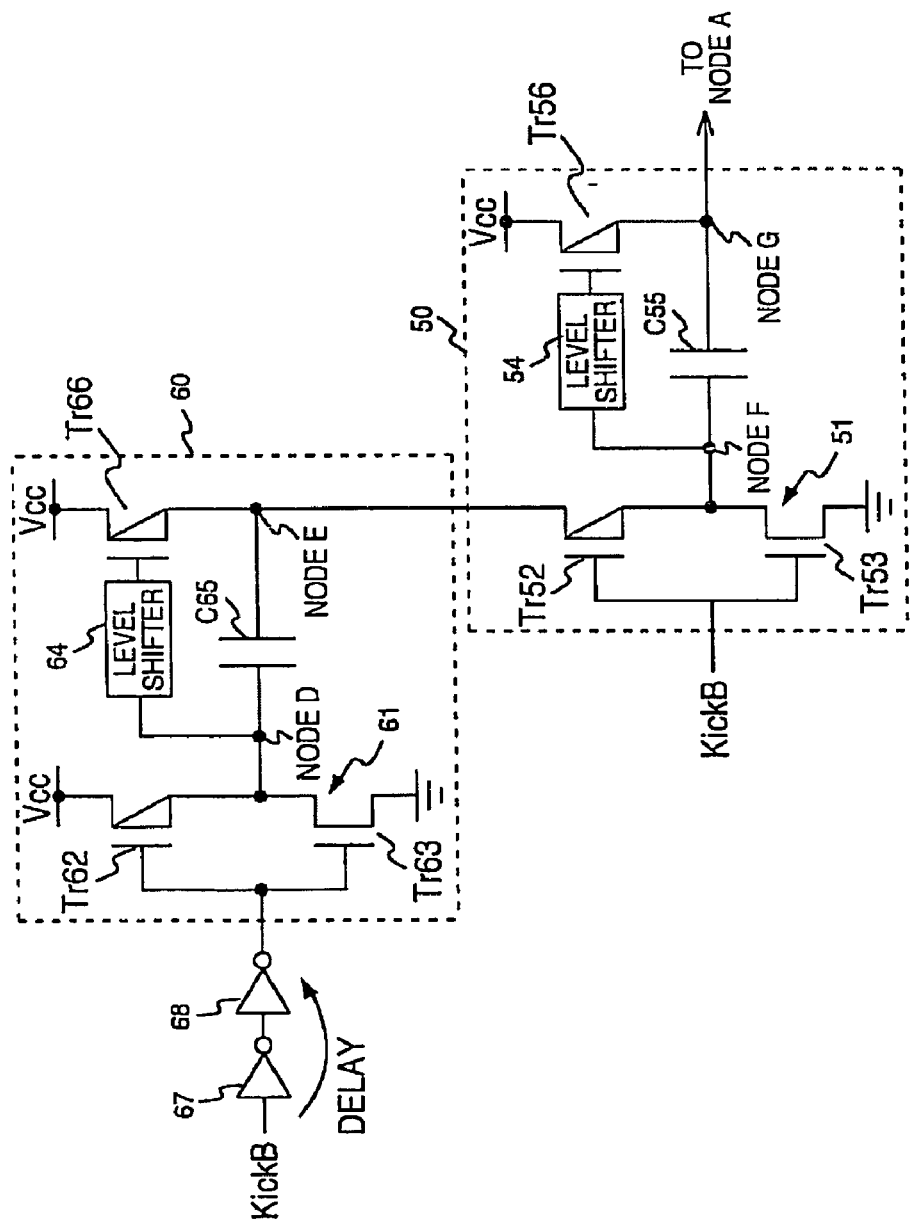
FIG. 8 is a view showing a booster circuit having two stages.

Next, referring to FIG. 8, a description will be given of the remaining configuration of the booster circuit 20. The booster circuit 20 shown in FIG. 8 includes a first booster circuit 50 and a second booster circuit 60. The first booster circuit 50 is composed of a CMOS switch 51 having a p-channel MOS transistor (hereinafter, referred to as pMOS transistor) 52 and an n-channel MOS transistor (hereinafter, referred to as nMOS transistor) 53, a level shifter 54, a capacitor 55 for boost, and a pMOS transistor 56. In the same manner, the second booster circuit 60 is composed of a CMOS switch 61 having a p-channel MOS transistor 62 and an n-channel MOS transistor 63, a level shifter 64, a capacitor 65 for boost, and a pMOS transistor 66.

Figure 9:
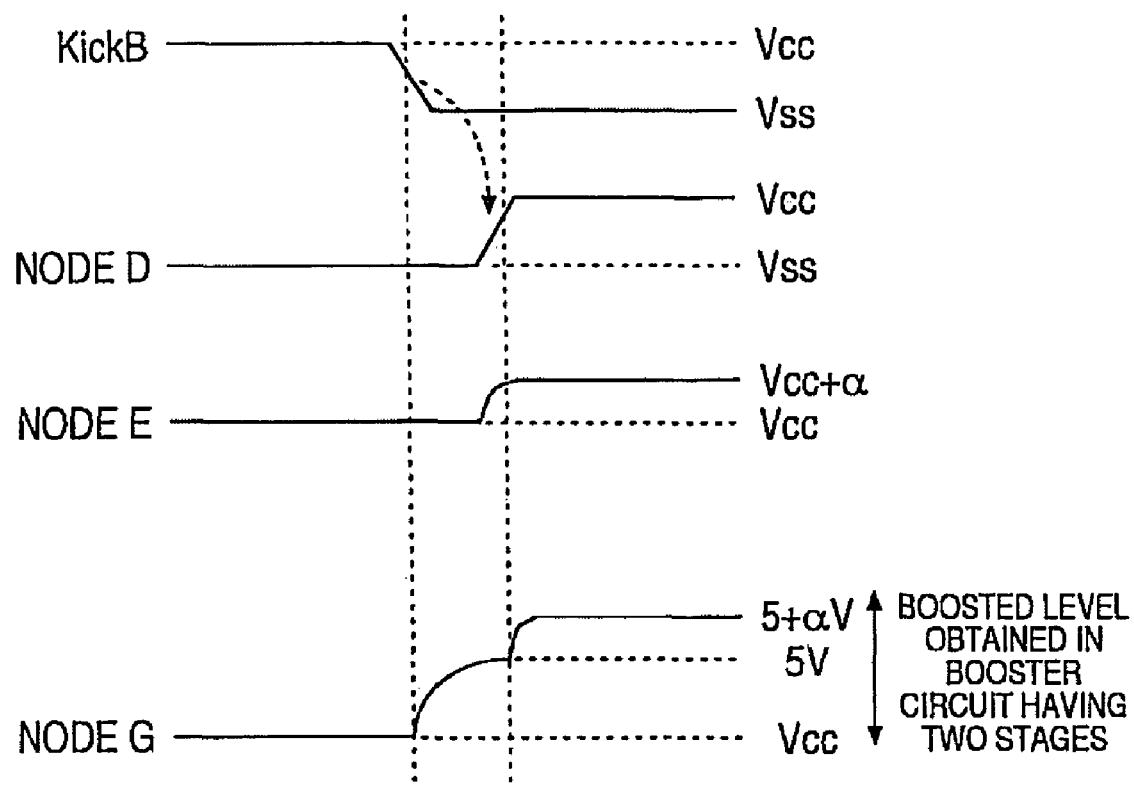
FIG. 9 is a view showing the voltage waveforms of the nodes in the booster circuit having the two stages.

Referring to a signal waveform chart shown in FIG. 9, a description will be given of the operation of the booster circuit 20. The address information to be read changes and the ATD signal becomes a high level, and then a kickB signal of high level is input into the first booster circuit 50 and the second booster circuit 60. This kickB signal is output from the pulse generating circuit 21.

After the kickB signal of high level is input, the nMOS transistors 53 and 63 of the CMOS switches 51 and 61 are respectively turned on. This makes the nodes F and D low level. The nodes F and D are set to low levels, the level shifters 54 and 64 respectively apply low-level voltages to the gate of the pMOS transistors 56 and 66. Then, the PMOS transistor 56 and 66 are turned on and charge nodes G and E to Vcc respectively.

Then, the kickB signal becomes the low level according to a low start of the ATD signal, and first, the pMOS transistor 52 of the CMOS switch 51 is turned on. This is because a signal, which has delayed the kickB signal by way of delay elements 67 and 68, is input into the second booster circuit 60. This charges the node F to the Vcc equal in potential to the node E. Hence, a one-shot positive pulse output is applied to the capacitor C55 and the node G is boosted up to the level higher than Vcc by the capacitive coupling of the capacitor C55, as shown in FIG. 9. Simultaneously, the pMOS transistor 56 in the first booster circuit 50 receives an output from the level shifter 54 and is turned off. In the present embodiment, a description will be given with Vcc set to 3 V and the voltage level higher than Vcc set to 5 V.

The kickB signal, which has been delayed via the delay elements 67 and 68, is input into the second booster circuit 60 in a low level and turns on the pMOS transistor 62. The node D is charged to Vcc as shown in FIG. 9, and the positive pulse output is applied to the capacitor C65. The node E is boosted up to a potential greater than Vcc by the capacitive coupling of the capacitor C65 as shown in FIG. 9. This boosted voltage is supplied to the node F by way of the pMOS transistor 52 to activate the capacitor 55 in the first booster circuit 50. That is, the node G is boosted up to the voltage further greater (5+α) V than 5 V by the capacitive coupling of the capacitor 55 (see FIG. 9).

Figure 10:
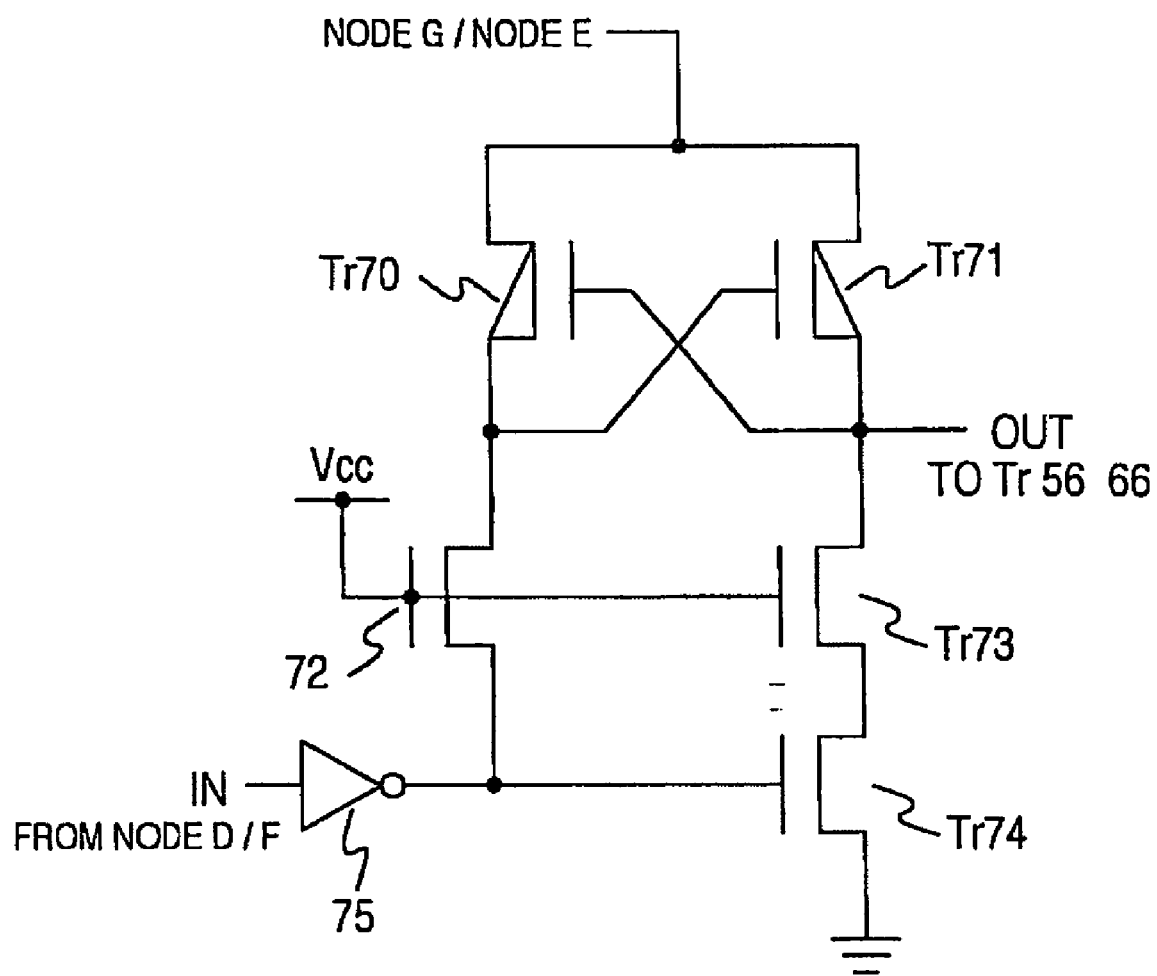
FIG. 10 is a view showing a configuration of a level shifter in the booster circuit having the two stages.

Here, referring to FIG. 10, a description will be given of the level shifters 54 and 64 respectively provided in the first booster circuit 50 and the second booster circuit 60. The level shifters 54 and 64 are circuits that convert the amplitude of Vss through Vcc that has been input, into the amplitude of Vss through a high voltage as an output. Each of the level shifters 54 and 64 includes, as shown in FIG. 10, pMOS transistors 70 and 71, nMOS transistors 72, 73, and 74, and an inverter 75. The voltage of the node G, shown in FIG. 9, is applied to sources of the pMOS transistors 70 and 71 in the level shifter 54. The voltage of the node E, shown in FIG. 9, is applied to sources of the pMOS transistors 70 and 71 in the level shifter 64. In addition, an input terminal of the level shifter 54 is connected to the node F, and an output terminal is connected to the gate of the pMOS transistor 56 shown in FIG. 8. In the same manner, an input terminal of the level shifter 64 is connected to the node D, and an output terminal is connected to the gate of the PMOS transistor 66 shown in FIG. 8.

The voltage applied to the input terminals of the level shifters 54 and 64 become high levels (Vcc), and the nMOS transistor 74 is turned off by the inverter 75. The power supply voltage Vcc is always applied to the gates of the nMOS transistors 72 and 73, resulting in the nMOS transistors 72 and 73 in the state of ON all the time. This turns on the pMOS transistor 71, and turns off the pMOS transistor 70. Accordingly, the voltage, which is equal to those of the nodes G and E connected to the source of the pMOS transistor 71, is output to an output terminal. Therefore, the voltage of Vcc+α is applied from Vcc according to the change in the voltages of the nodes G and E respectively provided in the pMOS transistors 56 and 66.

The voltage applied to the input terminals of the level shifters 54 and 64 become low levels (Vss), and the nMOS transistors 73 and 74 are turned on and the nMOS transistor 72 is turned off. The voltage of high level is applied to the source of the nMOS transistor 72 by the inverter 75, and accordingly, the current hardly flows through the nMOS transistor 72. This turns on the PMOS transistor 70 and turns off the pMOS transistor 71. Then, the output terminal becomes a low level. Consequently, the voltage of low level (Vss) is applied to the gates of the pMOS transistors 56 and 66.

By using the above-mentioned booster circuit, a desired boosted voltage is obtainable even if the power supply voltage is low.

Second Embodiment

Figure 11:
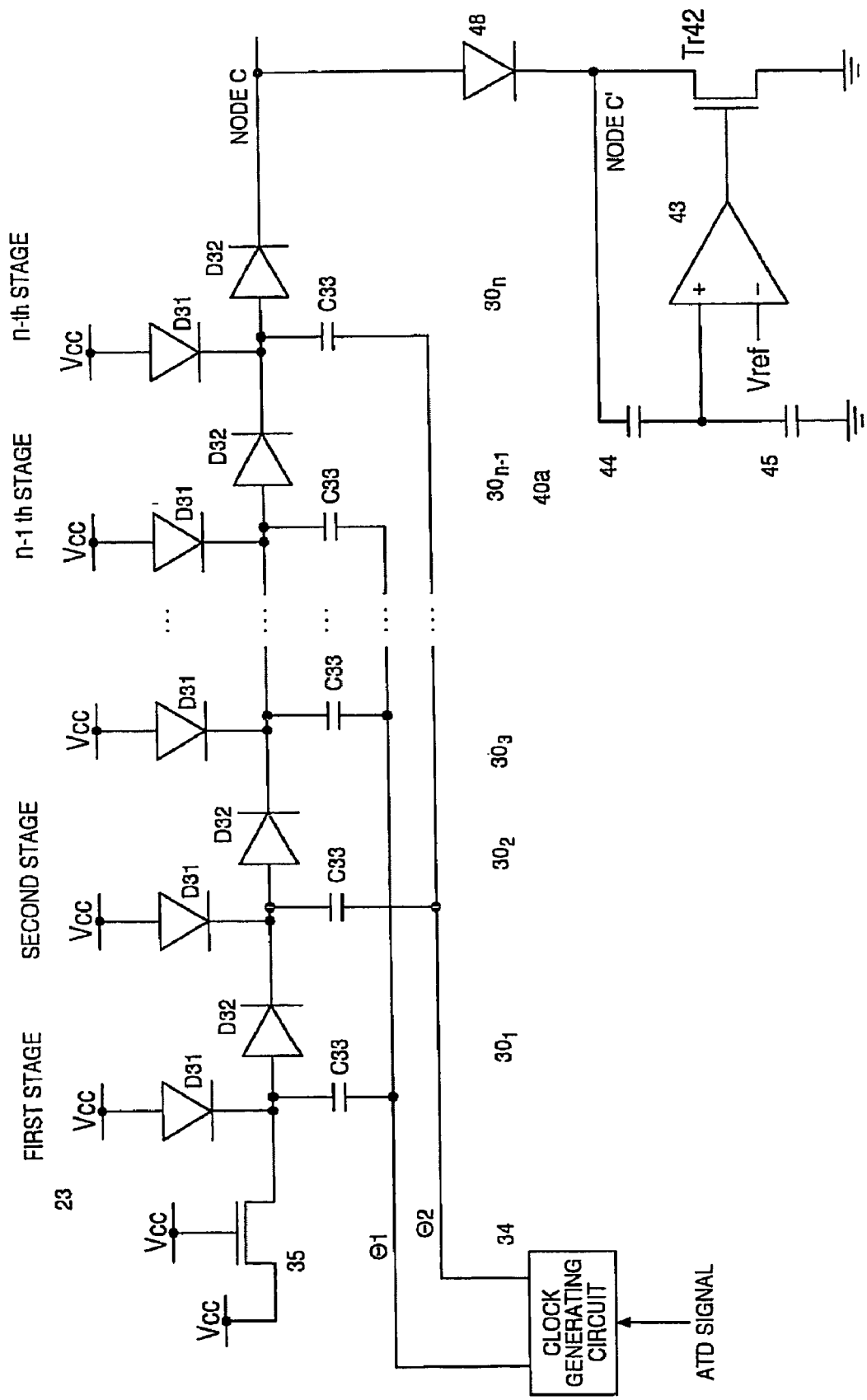
FIG. 11 is a view showing a configuration of a regulation circuit in accordance with a second embodiment.

In a second embodiment, a diode is employed to be provided between the regulation circuit and an output node of the charge pump circuit. Hereinafter, in the second embodiment, the same components and configurations as those of the first embodiment have the same reference numerals and a detailed explanation will be omitted. Generally, Vth of the diode may vary depending on the wafer due to the fluctuations in the manufacturing process. In the first embodiment, even if the node C is regulated at 5.7 V with Vth of the diode 24 regarded as 0.7 V, a desired potential (5.0 V) may not be available at the node A. For example, Vth of the diode 24 is 0.6 V after the wafer is manufactured, the potential of the node A becomes 5.1 V, which is slightly different from the desired voltage. In the second embodiment, a more accurate potential is generated at the node A. FIG. 11 is a circuit diagram showing the charge pump circuit 23 and a regulation circuit 40a. The components and configuration of the charge pump circuit 23 have the same reference numerals as shown in FIG. 6 of the first embodiment and a detailed explanation will be omitted. The regulation circuit 40a is coupled with the node C (the charge pump output node) through a diode 48 (a second diode). The anode of the diode 48 is coupled with the node C, and the cathode thereof is coupled with the regulation circuit 40a. The diode 48 is formed by a diode-connected transistor in which the source or drain terminal is short-circuited to the gate terminal. The diode 48 has the same configuration and size as the diode 24 shown in FIG. 4. The regulation circuit 40a does not include the nMOS transistor 41, although the regulation circuit of the first embodiment shown in FIG. 6 does. The components and configuration of the regulation circuit 40a have the same reference numerals as shown in FIG. 6 of the first embodiment and a detailed explanation will be omitted. Here, there is provided a node C' between the diode 48 and the regulation circuit 40a.

Referring to FIGS. 12A and 12B, a description will be given of the operation of the second embodiment. FIGS. 12A and 12B respectively show the voltages of the nodes A, C, and C'. In FIG. 12A, the diode 24 has a forward threshold voltage Vth of 0.7 V. In FIG. 12B, the diode 48 has the forward threshold voltage Vth of 0.6 V. Referring to FIG. 12A, when the ATD signal becomes a high level (a) in FIG. 12A, the regulation circuit 40a controls the node C' to be retained 5.0 V (which is identical to the voltage retained at the node A). Then, after the voltage of the node C reaches to 5.7 V ((d) in FIG. 12A) and exceeds 5.7 V, the charge of the node C flows into the regulation circuit 40a to operate to retain the node C at 5.7 V. The voltage of the node A is lowered by the diode 24 by the threshold voltage of the diode. That is to say, the voltage of the node A is shifted to 5.0 V by 0.7 V, from that of the node C.

Referring to FIG. 12B, if the diode 24 and the diode 48 respectively have the threshold values Vth of 0.6 V, the node C is retained at 5.6 V and the node A is retained at 5.0 V.

The second embodiment employs the regulation circuit 40a that retains the node C at a given voltage (a second given voltage). The regulation circuit 40a is coupled with the node C (the charge pump output node) through the diode 48, the node C being arranged between the charge pump circuit 23 and the diode 24 (the first diode). It is therefore possible to retain the node C at the given voltage (for example, 5.7 V).

The regulation circuit 40a is coupled with the node C through the diode 48 (the second diode). This makes it possible to retain the node C at the voltage of the node C' plus the threshold voltage of the diode 48.

The diode 48 has the same configuration and size as those of the diode 24. Accordingly, even if the threshold voltage of diode 24 varies depending on the fluctuation in the manufacturing process, the diode 24 substantially has the same threshold voltage as that of the diode 48. This results in a voltage shift between the node C and the node A almost equal to that between the node C and the node C'. It is therefore possible to suppress the fluctuation in the voltage of the node A caused by the fluctuations in the manufacturing process.

The regulation circuit 40a maintains the node C' at the voltage substantially equal to that of the node A (5.0 V). This is the reason why the node A has the voltage almost same as that of the node C', even if the threshold voltage of the diode 24 varies depending on the fluctuation in the manufacturing process. This makes it possible to suppress the fluctuation in the node A certainly.

The above-mentioned description of the first and second embodiments has been given of boosting the word line, however, the present invention is applicable to boosting the lines other than the word line.

Embodiments of the present claimed subject matter generally relates to semiconductor devices. More particularly, embodiments allow semiconductor devices to function with increased efficiency. In one implementation, the claimed subject matter is applicable to flash memory and devices that utilize flash memory. Flash memory is a form of non-volatile memory that can be electrically erased and reprogrammed. As such, flash memory, in general, is a type of electrically erasable programmable read only memory (EEPROM).

Like Electrically Erasable Programmable Read Only Memory (EEPROM), flash memory is nonvolatile and thus can maintain its contents even without power. However, flash memory is not standard EEPROM. Standard EEPROMs are differentiated from flash memory because they can be erased and reprogrammed on an individual byte or word basis while flash memory can be programmed on a byte or word basis, but is generally erased on a block basis. Although standard EEPROMs may appear to be more versatile, their functionality requires two transistors to hold one bit of data. In contrast, flash memory requires only one transistor to hold one bit of data, which results in a lower cost per bit. As flash memory costs far less than EEPROM, it has become the dominant technology wherever a significant amount of non-volatile, solid-state storage is needed.

Exemplary applications of flash memory include digital audio players, digital cameras, digital video recorders, and mobile phones. Flash memory is also used in USB flash drives, which are used for general storage and transfer of data between computers. Also, flash memory is gaining popularity in the gaming market, where low-cost fast-loading memory in the order of a few hundred megabytes is required, such as in game cartridges. Additionally, flash memory is applicable to cellular handsets, smartphones, personal digital assistants, set-top boxes, digital video recorders, networking and tele-communication equipments, printers, computer peripherals, automotive navigation devices, and gaming systems.

As flash memory is a type of non-volatile memory, it does not need power to maintain the information stored in the chip. In addition, flash memory offers fast read access times and better shock resistance than traditional hard disks. These characteristics explain the popularity of flash memory for applications such as storage on battery-powered devices (e.g., cellular phones, mobile phones, IP phones, wireless phones.).

Flash memory stores information in an array of floating gate transistors, called "cells", each of which traditionally stores one bit of information. However, newer flash memory devices, such as MirrorBit Flash Technology from Spansion Inc., can store more than 1 bit per cell. The MirrorBit cell doubles the intrinsic density of a Flash memory array by storing two physically distinct bits on opposite sides of a memory cell. Each bit serves as a binary bit of data (e.g., either 1 or 0) that is mapped directly to the memory array. Reading or programming one side of a memory cell occurs independently of whatever data is stored on the opposite side of the cell.

With regards to wireless markets, flash memory that utilizes MirrorBit technology has several key advantages. For example, flash memory that utilizes MirrorBit technology are capable of burst-mode access as fast as 80 MHz, page access times as fast as 25 ns, simultaneous read-write operation for combined code and data storage, and low standby power (e.g., 1 µA).

Figure 13:
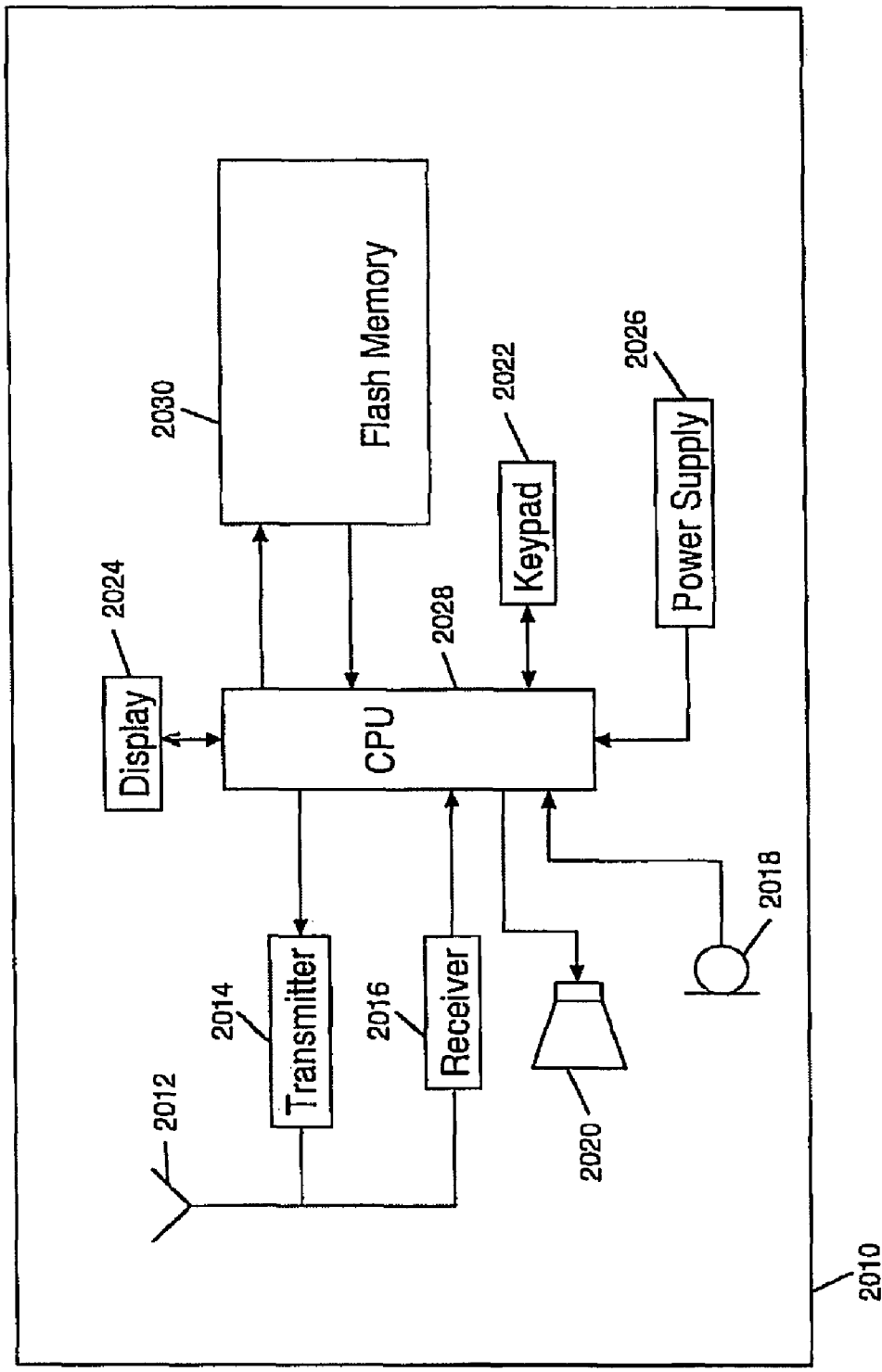
FIG. 13 illustrates a block diagram of a conventional portable phone, upon which embodiments can be implemented.

FIG. 13 shows a block diagram of a conventional portable telephone 2010 (a.k.a. cell phone, cellular phone, mobile phone, internet protocol phone, wireless phone, etc.), upon which embodiments can be implemented. The cell phone 2010 includes an antenna 2012 coupled to a transmitter 2014 a receiver 2016, as well as, a microphone 2018, speaker 2020, keypad 2022, and display 2024. The cell phone 2010 also includes a power supply 2026 and a central processing unit (CPU) 2028, which may be an embedded controller, conventional microprocessor, or the like. In addition, the cell phone 2010 includes integrated, flash memory 2030. Flash memory 2030 includes: a booster circuit that boosts a selected line to a first given voltage higher than a power supply voltage; and a charge pump circuit that retains the selected line at the first given voltage. By providing a semiconductor device and a word line boosting method that can apply the voltage higher than the power supply voltage to the selected word line, embodiments enable the accuracy for reading from and writing into a memory cell to be improved. This improvement in flash memory translates into performance improvements in various devices, such as personal digital assistants, set-top boxes, digital video recorders, networking and telecommunication equipments, printers, computer peripherals, automotive navigation devices, gaming systems, mobile phones, cellular phones, internet protocol phones, and/or wireless phones.

Flash memory comes in two primary varieties, NOR-type flash and NAND-type flash. While the general memory storage transistor is the same for all flash memory, it is the interconnection of the memory cells that differentiates the designs. In a conventional NOR-type flash memory, the memory cell transistors are connected to the bit lines in a parallel configuration, while in a conventional NAND-type flash memory, the memory cell transistors are connected to the bit lines in series. For this reason, NOR-type flash is sometimes referred to as "parallel flash" and NAND-type flash is referred to as "serial flash."

Traditionally, portable phone (e.g., cell phone) CPUs have needed only a small amount of integrated NOR-type flash memory to operate. However, as portable phones (e.g., cell phone) have become more complex, offering more features and more services (e.g., voice service, text messaging, camera, ring tones, email, multimedia, mobile TV, MP3, location, productivity software, multiplayer games, calendar, and maps.), flash memory requirements have steadily increased. Thus, a more efficient flash memory will render a portable phone more competitive in the telecommunications market.

Also, as mentioned above, flash memory is applicable to a variety of devices other than portable phones. For instance, flash memory can be utilized in personal digital assistants, set-top boxes, digital video recorders, networking and telecommunication equipments, printers, computer peripherals, automotive navigation devices, and gaming systems.

Figure 14:
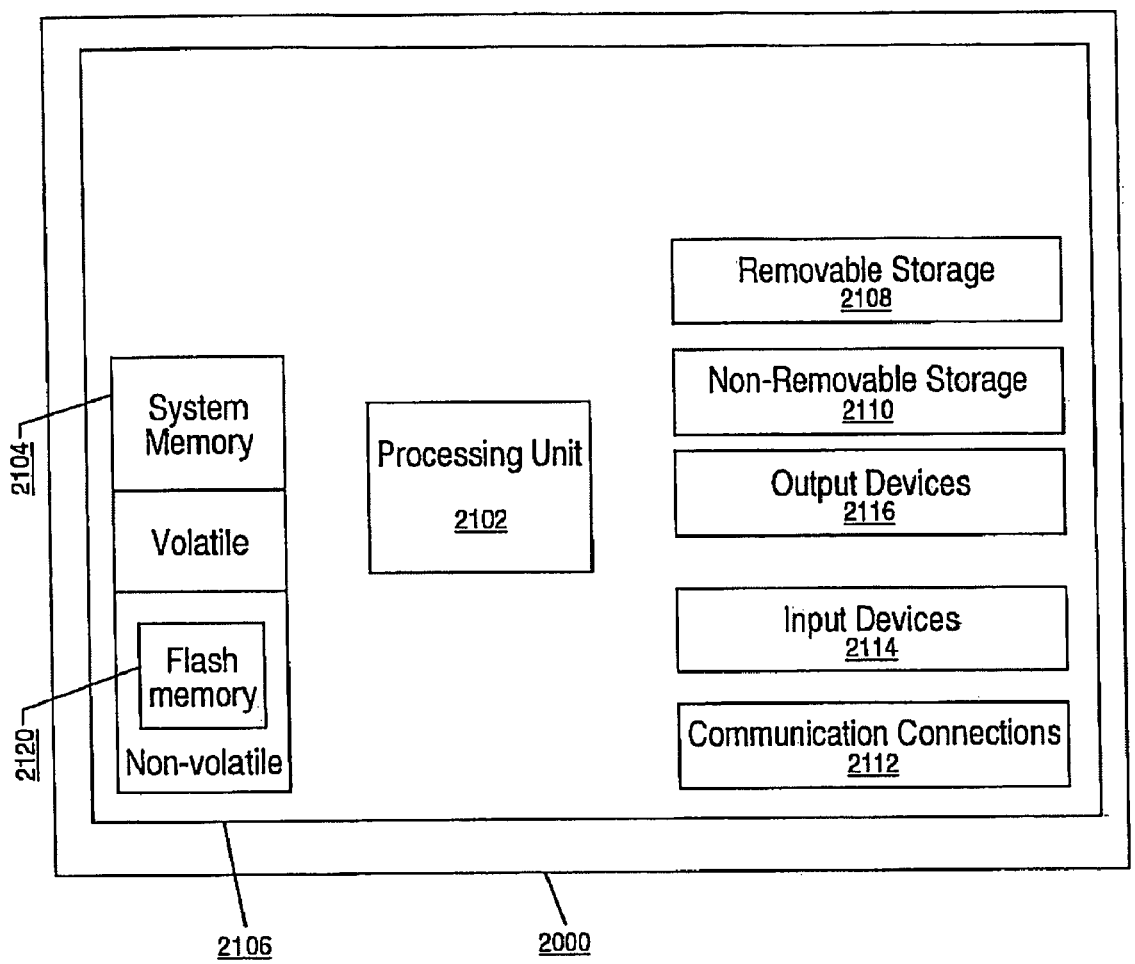
FIG. 14 illustrates a block diagram of a computing device, upon which embodiments of the present claimed subject matter can be implemented.

FIG. 14 illustrates a block diagram of a computing device 2100, upon which embodiments of the present claimed subject matter can be implemented. Although computing device 2100 is shown and described in FIG. 14 as having certain numbers and types of elements, the embodiments are not necessarily limited to the exemplary implementation. That is, computing device 2100 can include elements other than those shown, and can include more than one of the elements that are shown. For example, computing device 2100 can include a greater number of processing units than the one (processing unit 2102) shown. Similarly, in another example, computing device 2100 can include additional components not shown in FIG. 14.

Also, it is important to note that the computing device 2100 can be a variety of things. For example, computing device 2100 can be but are not limited to a personal desktop computer, a portable notebook computer, a personal digital assistant (PDA), and a gaming system. Flash memory is especially useful with small-form-factor computing devices such as PDAs and portable gaming devices. Flash memory offers several advantages. In one example, flash memory is able to offer fast read access times while at the same time being able to withstand shocks and bumps better than standard hard disks. This is important as small computing devices are often moved around and encounters frequent physical impacts. Also, flash memory is more able than other types of memory to withstand intense physical pressure and/or heat. And thus, portable computing devices are able to be used in a greater range of environmental variables.

In its most basic configuration, computing device 2100 typically includes at least one processing unit 2102 and memory 2104. Depending on the exact configuration and type of computing device, memory 2104 may be volatile (such as RAM), non-volatile (such as ROM, flash memory, etc.) or some combination of the two. This most basic configuration of computing device 2100 is illustrated in FIG. 14 by line 2106. Additionally, device 2100 may also have additional features/functionality. For example, device 2100 may also include additional storage (removable and/or non-removable) including, but not limited to, magnetic or optical disks or tape. In one example, in the context of a gaming system, the removable storage could a game cartridge receiving component utilized to receive different game cartridges. In another example, in the context of a Digital Video Disc (DVD) recorder, the removable storage is a DVD receiving component utilized to receive and read DVDs. Such additional storage is illustrated in FIG. 14 by removable storage 2108 and non-removable storage 2110. Computer storage media includes volatile and nonvolatile, removable and non-removable media implemented in any method or technology for storage of information such as computer readable instructions, data structures, program modules or other data. Memory 2104, removable storage 2108 and non-removable storage 2110 are all examples of computer storage media. Computer storage media includes, but is not limited to, RAM, ROM, EEPROM, flash memory 2120 or other memory technology, CD-ROM, digital video disks (DVD) or other optical storage, magnetic cassettes, magnetic tape, magnetic disk storage or other magnetic storage devices, or any other medium which can be used to store the desired information and which can accessed by device 2100. Any such computer storage media may be part of device 2100.

In the present embodiment, the flash memory 2120 comprises: a booster circuit that boosts a selected line to a first given voltage higher than a power supply voltage; and a charge pump circuit that retains the selected line at the first given voltage. By providing a semiconductor device and a word line boosting method that can apply the voltage higher than the power supply voltage to the selected word line, embodiments enable the accuracy for reading from and writing into a memory cell to be improved. This improvement in flash memory translates into performance improvements in various devices, such as personal digital assistants, set-top boxes, digital video recorders, networking and telecommunication equipments, printers, computer peripherals, automotive navigation devices, gaming systems, mobile phones, cellular phones, internet protocol phones, and/or wireless phones.

Further, in one embodiment, the flash memory 2120 utilizes MirrorBit technology to allow storing of two physically distinct bits on opposite sides of a memory cell.

Device 2100 may also contain communications connection(s) 2112 that allow the device to communicate with other devices. Communications connection(s) 2112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 2100 may also have input device(s) 2114 such as keyboard, mouse, pen, voice input device, game input device (e.g., a joy stick, a game control pad, and/or other types of game input device), touch input device, etc. Output device(s) 2116 such as a display (e.g., a computer monitor and/or a projection system), speakers, printer, network peripherals, etc., may also be included. All these devices are well know in the art and need not be discussed at length here.

Aside from mobile phones and portable computing devices, flash memory is also widely used in portable multimedia devices, such as portable music players. As users would desire a portable multimedia device to have as large a storage capacity as possible, an increase in memory density would be advantageous. Also, users would also benefit from reduced memory read time.

Figure 15:
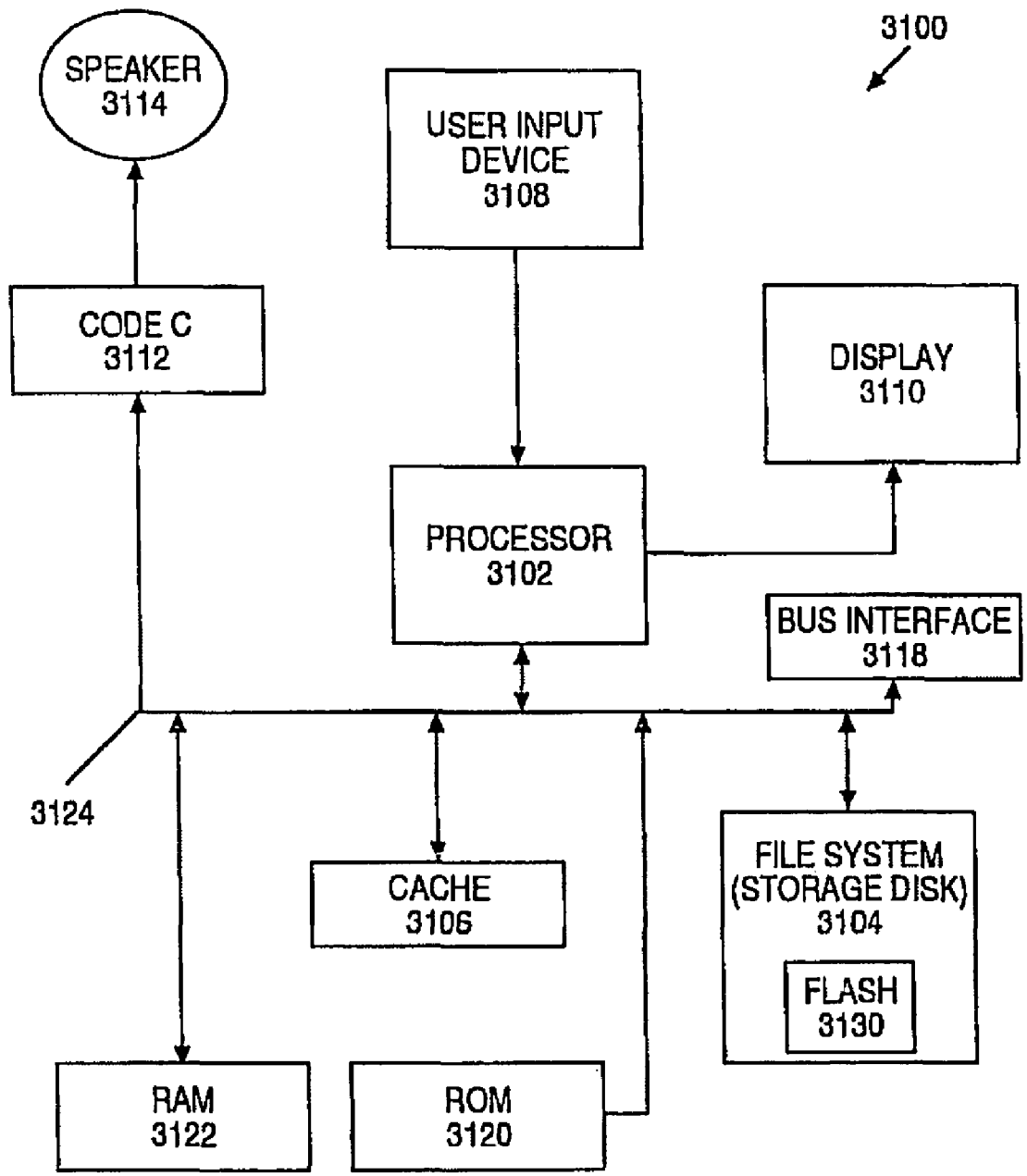
FIG. 15 illustrates an exemplary portable multimedia device, or media player, in accordance with an embodiment of the present claimed subject matter.

FIG. 15 shows an exemplary portable multimedia device, or media player, 3100 in accordance with an embodiment of the invention. The media player 3100 includes a processor 3102 that pertains to a microprocessor or controller for controlling the overall operation of the media player 3100. The media player 3100 stores media data pertaining to media assets in a file system 3104 and a cache 3106. The file system 3104 is, typically, a storage disk or a plurality of disks. The file system 3104 typically provides high capacity storage capability for the media player 3100. Also, file system 3104 includes flash memory 3130. In the present embodiment, the flash memory 3130 comprises: a booster circuit that boosts a selected line to a first given voltage higher than a power supply voltage; and a charge pump circuit that retains the selected line at the first given voltage. By providing a semiconductor device and a word line boosting method that can apply the voltage higher than the power supply voltage to the selected word line, embodiments enable the accuracy for reading from and writing into a memory cell to be improved. This improvement in flash memory translates into performance improvements in various devices, such as personal digital assistants, set-top boxes, digital video recorders, networking and telecommunication equipments, printers, computer peripherals, automotive navigation devices, gaming systems, mobile phones, cellular phones, internet protocol phones, and/or wireless phones.

However, since the access time to the file system 3104 is relatively slow, the media player 3100 can also include a cache 3106. The cache 3106 is, for example, Random-Access Memory (RAM) provided by semiconductor memory. The relative access time to the cache 3106 is substantially shorter than for the file system 3104. However, the cache 3106 does not have the large storage capacity of the file system 3104. Further, the file system 3104, when active, consumes more power than does the cache 3106. The power consumption is particularly important when the media player 3100 is a portable media player that is powered by a battery (not shown). The media player 3100 also includes a RAM 3120 and a Read-Only Memory (ROM) 3122. The ROM 3122 can store programs, utilities or processes to be executed in a non-volatile manner. The RAM 3120 provides volatile data storage, such as for the cache 3106.

The media player 3100 also includes a user input device 3108 that allows a user of the media player 3100 to interact with the media player 3100. For example, the user input device 3108 can take a variety of forms, such as a button, keypad, dial, etc. Still further, the media player 3100 includes a display 3110 (screen display) that can be controlled by the processor 3102 to display information to the user. A data bus 3124 can facilitate data transfer between at least the file system 3104, the cache 3106, the processor 3102, and the CODEC 3110. The media player 3100 also includes a bus interface 3116 that couples to a data link 3118. The data link 3118 allows the media player 3100 to couple to a host computer.

In one embodiment, the media player 3100 serves to store a plurality of media assets (e.g., songs) in the file system 3104. When a user desires to have the media player play a particular media item, a list of available media assets is displayed on the display 3110. Then, using the user input device 3108, a user can select one of the available media assets. The processor 3102, upon receiving a selection of a particular media item, supplies the media data (e.g., audio file) for the particular media item to a coder/decoder (CODEC) 3110. The CODEC 3110 then produces analog output signals for a speaker 3114. The speaker 3114 can be a speaker internal to the media player 3100 or external to the media player 3100. For example, headphones or earphones that connect to the media player 3100 would be considered an external speaker.

For example, in a particular embodiment, the available media assets are arranged in a hierarchical manner based upon a selected number and type of groupings appropriate to the available media assets. For example, in the case where the media player 3100 is an MP3 type media player, the available media assets take the form of MP3 files (each of which corresponds to a digitally encoded song or other audio rendition) stored at least in part in the file system 3104. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

Figure 16:
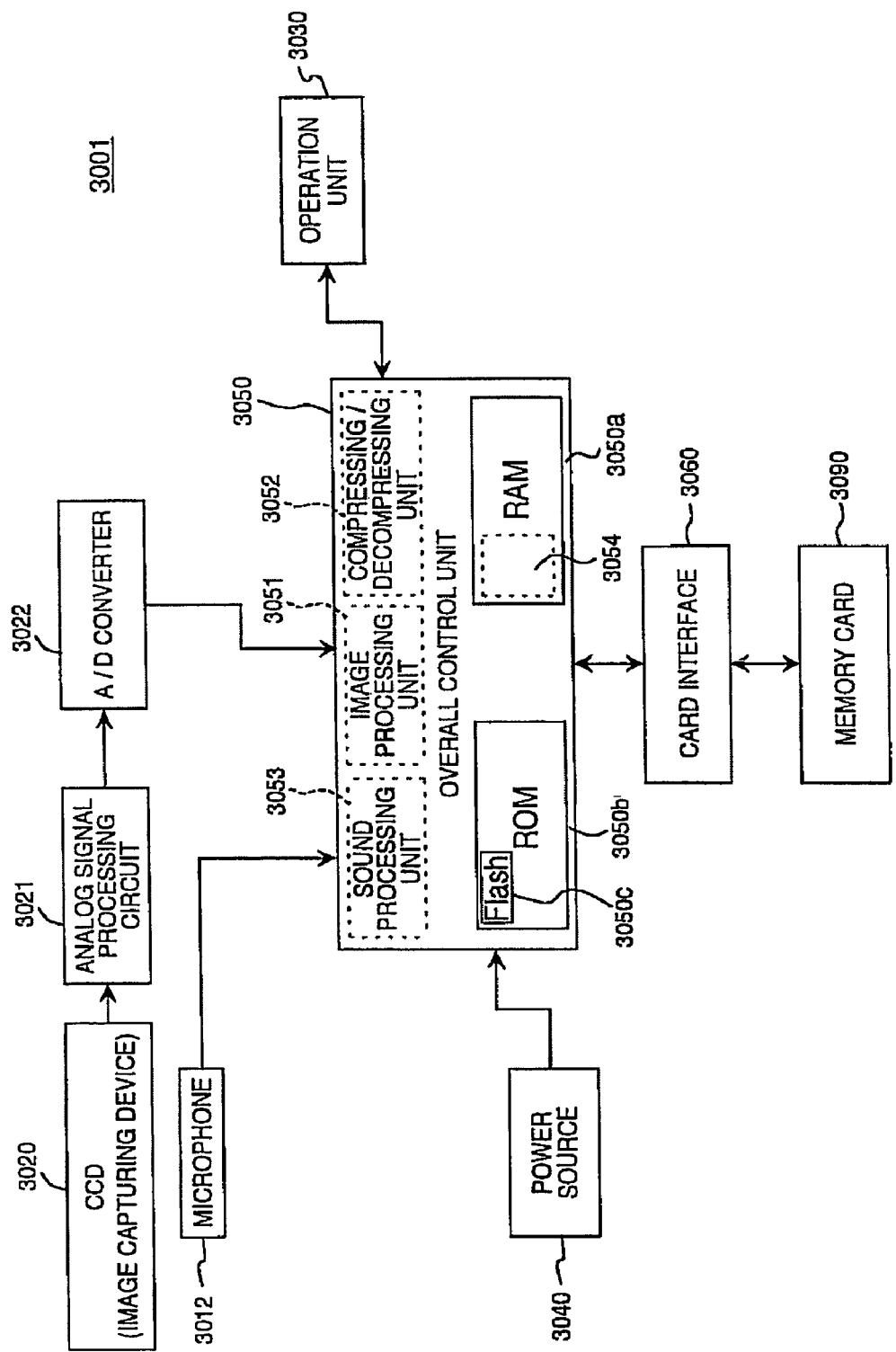
FIG. 16 illustrates an exemplary digital camera, in accordance with an embodiment of the present claimed subject matter.

Referring to FIG. 16, the internal configuration of a digital camera 3001 is described. FIG. 16 is a block diagram showing the internal functions of the digital camera 3001. The CCD (image capturing device) 3020 functions as image capturing means for capturing a subject image and generating an electronic image signal and has, for example, 1600 times 1200 pixels. The CCD 3020 photoelectrically converts a light image of the subject formed by the taking lens into image signals (signal made of a signal sequence of pixel signals received by the pixels) of R (red), G (green) and B (blue) pixel by pixel and outputs the image signal.

The image signal obtained from the CCD 3020 is supplied to an analog signal processing circuit 3021. In the analog signal processing circuit 3021, the image signal (analog signal) is subjected to a predetermined analog signal process. The analog signal processing circuit 3021 has a correlated double sampling circuit (CDS) and an automatic gain control circuit (AGC) and adjusts the level of the image signal by performing a process of reducing noise in the image signal by the correlated double sampling circuit and adjusting the gain by the automatic gain control circuit.

An A/D converter 3022 converts each of pixel signals of the image signal into a digital signal of 12 bits. The digital signal obtained by the conversion is temporarily stored as image data in a buffer memory 3054 in a RAM 3050a. The image data stored in the buffer memory 3054 is subjected to WB (white balance) process, gamma correction process, color correction process and the like by an image processing unit 3051 and, after that, the processed signal is subjected to a compressing process or the like by a compressing/decompressing unit 3052.

A sound signal obtained from the microphone 3012 is inputted to a sound processing unit 3053. The sound signal inputted to the sound processing unit 3053 is converted into a digital signal by an A/D converter (not shown) provided in the sound processing unit 3053 and the digital signal is temporarily stored in the buffer memory 3054.

An operation unit is an operation unit that can include a power source button and a shutter release button and is used when the user performs an operation of changing a setting state of the digital camera 3001 and an image capturing operation.

A power source 3040 is a power supply source of the digital camera 3001. The digital camera 3001 is driven by using a secondary battery such as a lithium ion battery as the power source battery BT.

An overall control unit 3050 is constructed by a microcomputer having therein the RAM 3050a and a ROM 3050b. When the microcomputer executes a predetermined program, the overall control unit 3050 functions as a controller for controlling the above-described components in a centralized manner. The overall control unit 3050 also controls, for example, a live view display process and a process of recording data to a memory card. The RAM 3050a is a semiconductor memory (such as DRAM) which can be accessed at high speed and the ROM 3050b takes the form of, for example, an electrically-rewritable nonvolatile semiconductor memory (such as flash ROM 3050c). A flash memory, in one embodiment, includes: a booster circuit that boosts a selected line to a first given voltage higher than a power supply voltage; and a charge pump circuit that retains the selected line at the first given voltage. By providing a semiconductor device and a word line boosting method that can apply the voltage higher than the power supply voltage to the selected word line, embodiments enable the accuracy for reading from and writing into a memory cell to be improved. This improvement in flash memory translates into performance improvements in various devices, such as personal digital assistants, set-top boxes, digital video recorders, networking and telecommunication equipments, printers, computer peripherals, automotive navigation devices, gaming systems, mobile phones, cellular phones, internet protocol phones, and/or wireless phones.

An area as a part of the RAM 3050a functions as a buffer area for temporary storing data. This buffer area is referred to as the buffer memory 3054. The buffer memory 3054 temporarily stores image data and sound data.

The overall control unit 3050 has the image processing unit 3051, compressing/decompressing unit 3052 and sound processing unit 3053. The processing units 3051, 3052 and 3053 are function parts realized when the microcomputer executes a predetermined program.

The image processing unit 3051 is a processing unit for performing various digital imaging processes such as WB process and gamma correcting process. The WB process is a process of shifting the level of each of the color components of R, G and B and adjusting color balance. The gamma correcting process is a process of correcting the tone of pixel data. The compressing/decompressing unit 3052 is a processing unit for performing an image data compressing process and an image data decompressing process. As the compressing method, for example, the JPEG method is employed. The sound processing unit 3053 is a processing unit for performing various digital processes on sound data.

A card interface (I/F) 3060 is an interface for writing/reading image data to/from the memory card 3090 inserted into the insertion port in the side face of the digital camera 1. At the time of reading/writing image data from/to the memory card 3090, the process of compressing or decompressing image data is performed according to, for example, the JPEG method in the compressing/decompressing unit 3052, and image data is transmitted/received between the buffer memory 3054 and the memory card 3090 via the card interface 3060. Also at the time of reading/writing sound data, sound data is transmitted/received between the buffer memory 3054 and the memory card 3090 via the card interface 3060.

Further, by using the card interface 3060, the digital camera 3001 transmits/receives data such as an image and sound and, in addition, can load a program which operates on the digital camera 3001. For example, a control program recorded on the memory card 3090 can be loaded into the RAM 3050a or ROM 3050b of the overall control unit 3050. In such a manner, the control program can be updated.

Also by communication with an external device (such as an external computer) via a USB terminal, various data such as an image and sound and a control program can be transmitted/received. For example, various data, a program, and the like recorded on a recording medium (CD-R/RW or CD-ROM) which is set into a reader (optical drive device or the like) of the external computer can be obtained via the USB terminal.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of operating a memory device, said method comprising:
   charging a word line to a power supply voltage level;
   boosting said word line to a higher voltage level than said power supply voltage level; and
   preventing discharge of said word line below said higher voltage level.

2. The method of claim 1, further comprising:
   reading a memory cell coupled to said word line.

3. The method of claim 1, further comprising:
   programming a memory cell coupled to said word line.

4. The method of claim 1, wherein said boosting said word line comprises:
   coupling said word line to a boosting capacitor; and
   applying a one-shot positive pulse to said boosting capacitor.

5. The method of claim 1, wherein said preventing discharge comprises:
   coupling said word line to a cathode of a diode; and
   coupling an anode of said diode to an output of a charge pump circuit.

6. The method of claim 5, wherein said preventing discharge further comprises:
   regulating said output of said charge pump circuit.

7. The method of claim 1, further comprising:
   detecting a change in an address signal; and
   in response to detection of change, starting said boosting said word line and starting said preventing discharge.

8. A method of operating a memory device, said method comprising:
   in response to change in an address signal, boosting a voltage level of a word line from a power supply voltage value to a higher voltage value; and
   preventing discharge of said word line below said higher voltage value.

9. The method of claim 8, further comprising:
   reading a memory cell coupled to said word line.

10. The method of claim 8, further comprising:
    programming a memory cell coupled to said word line.

11. The method of claim 8, wherein said boosting said voltage level comprises:
    coupling said word line to a boosting capacitor; and
    applying a one-shot positive pulse to said boosting capacitor.

12. The method of claim 8, wherein said preventing discharge comprises:
    coupling said word line to a cathode of a diode; and
    coupling an anode of said diode to an output of a charge pump circuit.

13. The method of claim 12, wherein said preventing discharge further comprises:
    regulating said output of said charge pump circuit.

14. The method of claim 8, further comprising:
    precharging said voltage level of said word line to said power supply voltage value.

15. A method of operating a memory device, said method comprising:
    initiating a memory operation;
    in response to initiation of said memory operation, boosting a voltage level of a word line from a power supply voltage value to a higher voltage value; and
    preventing discharge of said higher voltage value of said word line.

16. The method of claim 15, wherein said memory operation comprises a read operation.

17. The method of claim 15, wherein said memory operation comprises a program operation.

18. The method of claim 15, wherein said boosting said voltage level comprises:
    coupling said word line to a boosting capacitor; and
    applying a one-shot positive pulse to said boosting capacitor.

19. The method of claim 15, wherein said preventing discharge comprises:
    coupling said word line to a cathode of a diode; and
    coupling an anode of said diode to an output of a charge pump circuit.

20. The method of claim 19, wherein said preventing discharge further comprises:
    regulating said output of said charge pump circuit.

* * * * *